(12) United States Patent
Oyabu

(10) Patent No.: US 9,872,222 B2
(45) Date of Patent: Jan. 16, 2018

(54) COMMUNICATION SYSTEM, BASE STATION, MOBILE STATION, AND COMMUNICATION METHOD

(71) Applicant: KYOCERA CORPORATION, Kyoto-shi, Kyoto (JP)

(72) Inventor: Takahiro Oyabu, Hachioji (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 14/894,499

(22) PCT Filed: May 28, 2014

(86) PCT No.: PCT/JP2014/064193
§ 371 (c)(1),
(2) Date: Nov. 27, 2015

(87) PCT Pub. No.: WO2014/192835
PCT Pub. Date: Dec. 4, 2014

(65) Prior Publication Data
US 2016/0119852 A1    Apr. 28, 2016

(30) Foreign Application Priority Data
May 28, 2013   (JP) ................................ 2013-111941

(51) Int. Cl.
*H04W 88/06* (2009.01)
*H04W 36/36* (2009.01)
(Continued)

(52) U.S. Cl.
CPC ........... *H04W 36/36* (2013.01); *H04W 48/16* (2013.01); *H04W 48/18* (2013.01); *H04W 88/06* (2013.01); *Y02B 60/50* (2013.01)

(58) Field of Classification Search
CPC ..... H04W 88/06; H04W 48/16; H04W 48/18; H04W 36/36; H04W 48/10;
(Continued)

(56) References Cited

U.S. PATENT DOCUMENTS 6,014,566 A * 1/2000 Owada ................. H04W 16/32
455/444
7,529,206 B2 * 5/2009 Han ...................... H04W 36/06
370/331
(Continued)

FOREIGN PATENT DOCUMENTS

JP   2004-350109 A   12/2004
JP   2005-130473 A    5/2005
(Continued)

OTHER PUBLICATIONS

International Search Report dated Sep. 2, 2014, corresponding to International application No. PCT/JP2014/064193.
(Continued)

*Primary Examiner* — Meless Zewdu
(74) *Attorney, Agent, or Firm* — Hauptman Ham, LLP

(57) ABSTRACT

A communication system includes: a first base station that supports a first wireless communication scheme; a second base station that supports a second wireless communication scheme; and a mobile station. The first base station acquires communication information on a communication state of the second wireless communication scheme and the first base station includes a wireless communication unit that transmits a notification signal including the communication information by the first wireless communication scheme. The mobile station receives the notification signal by the first wireless communication scheme and the mobile station includes a controller that selects whether to maintain data communication by the first wireless communication scheme or to switch the first wireless communication scheme to the
(Continued)

second wireless communication scheme, based on the communication information included in the notification signal and an amount of communication data processed by the mobile station.

13 Claims, 6 Drawing Sheets

(51) Int. Cl.
 *H04W 48/16* (2009.01)
 *H04W 48/18* (2009.01)
(58) Field of Classification Search
 CPC ........... H04W 72/048; H04W 28/0221; H04W 36/16; H04W 48/17; H04W 48/20; H04W 88/02; H04W 52/00; H04W 4/20; H04W 68/00; H04W 72/0406; H04W 52/244; H04W 8/14; H04W 4/02; H04W 36/00; H04W 36/0005; H04W 36/22; H04W 36/08; H04W 36/34; H04W 88/18; H04W 88/08; H04W 88/10; H04W 60/00; H04W 48/00; Y02B 60/50; Y02B 70/10
 See application file for complete search history.

(56) References Cited

U.S. PATENT DOCUMENTS

| | | | | |
|---|---|---|---|---|
| 8,908,625 | B2* | 12/2014 | Yamazaki | H04W 48/16 370/328 |
| 2003/0017838 | A1* | 1/2003 | Kayama | H04W 48/20 455/525 |
| 2005/0181776 | A1 | 8/2005 | Verma et al. | |
| 2006/0168310 | A1* | 7/2006 | Koyanagi | H04L 47/14 709/233 |
| 2006/0293042 | A1* | 12/2006 | Hosokawa | H04W 88/06 455/422.1 |
| 2008/0214191 | A1* | 9/2008 | Yach | H04M 1/72519 455/435.2 |
| 2008/0268844 | A1* | 10/2008 | Ma | H04W 36/0033 455/436 |
| 2009/0239570 | A1* | 9/2009 | Koyanagi | H04W 36/0077 455/525 |
| 2009/0257398 | A1* | 10/2009 | Koyanagi | H04W 48/18 370/331 |
| 2011/0007714 | A1* | 1/2011 | Nagasawa | H04L 47/14 370/332 |
| 2011/0317578 | A1* | 12/2011 | Tomita | H04W 36/02 370/252 |
| 2012/0135739 | A1 | 5/2012 | Paterson | |
| 2012/0218966 | A1* | 8/2012 | Yamazaki | H04W 48/16 370/329 |
| 2013/0130740 | A1* | 5/2013 | Saito | H04W 36/30 455/552.1 |
| 2014/0105180 | A1* | 4/2014 | Grant | H04W 36/30 370/332 |
| 2014/0171078 | A1* | 6/2014 | Ryerson | H04W 48/18 455/435.2 |

FOREIGN PATENT DOCUMENTS

| | | | | |
|---|---|---|---|---|
| JP | 2007-300420 A | | 11/2007 | |
| JP | 2008-11452 A | | 1/2008 | |
| JP | 2009071864 A | * | 4/2009 | ........... H04W 28/22 |
| JP | 2009-194805 A | | 8/2009 | |
| JP | 2010-114754 A | | 5/2010 | |
| JP | 2010-166355 A | | 7/2010 | |
| JP | 2010-233251 A | | 10/2010 | |
| WO | 2011/019083 A1 | | 2/2011 | |
| WO | WO2011052774 A1 | * | 5/2011 | ........... H04W 84/10 |

OTHER PUBLICATIONS

Office Action in JP Application No. 2013-111941, dated Dec. 20, 2016.

* cited by examiner

COMMUNICATION SYSTEM, BASE STATION, MOBILE STATION, AND COMMUNICATION METHOD

RELATED APPLICATIONS

The present application is a National Phase of International Application Number PCT/JP2014/064193, filed May 28, 2014, and claims priority of Japanese Patent Application No. 2013-111941 filed on May 28, 2013.

TECHNICAL FIELD

The present invention relates to a communication system and a communication method and a base station and a mobile station which are included in the communication system, which are possible to employ various wireless communication schemes.

BACKGROUND ART

As a wireless communication scheme which can be employed in a communication system, various communication schemes such as a personal handy phone system (PHS) or a long term evolution (LTE) are known. With progress of the wireless communication scheme, mobile stations supporting the various wireless communication schemes are provided. Specifically, there is provided a mobile station that can access both of the PHS, which is supplied from a long time ago and thus has a wide coverage area, and the LTE, which can carry out a high-speed communication but has a limited coverage area.

Generally, when various wireless communication schemes can be employed in a communication system, a mobile station uses a higher speed communication scheme. This is because a scheme having a higher data transmission speed can smoothly supply more diverse services.

However, a new high-speed wireless communication scheme has a tendency of increasing power consumption sometimes. The reasons are as follows. The first reason is that it is necessary to increase an output of a radio wave so as to reduce errors even in a multi-level modulation. The second reason is that an output of an amplifier in a mobile station is increased in a case of an out-of-range area or a weak radio wave. The third reason is that, since a coverage area is narrow, and power consumption for cell search is increased in a waiting state.

In this regard, Patent Literatures 1 and 2 disclose techniques in which a mobile station supporting various wireless communication schemes having different power consumptions switches the employed wireless communication scheme depending on the residual capacity of a battery.

CITATION LIST

Patent Literature

Patent Literature 1: Japanese Unexamined Patent Application Publication No. 2009-194805
Patent Literature 2: Japanese Unexamined Patent Application Publication No. 2010-166355

SUMMARY OF THE INVENTION

Technologies disclosed in the patent literatures 1 and 2 use a manner in which a wireless communication scheme having small power consumption is employed preferentially in a only case where the residual capacity of a battery is small and a wireless communication scheme having larger power consumption (higher speed) is employed in the other cases such as the residual capacity of a battery is large.

In the technologies, it is difficult to sufficiently reduce the power consumption of a mobile station in the case where various wireless communication schemes having different power consumptions can be employed.

The present invention provides a communication system, a base station, a mobile station, and a communication method which can satisfactorily reduce power consumption while supporting various wireless communication schemes.

According to an aspect of the present invention, a communication system includes: a first base station that supports a first wireless communication scheme; a second base station that supports a second wireless communication scheme having a faster communication speed and larger power consumption during wireless communication than the first wireless communication scheme; and a mobile station that supports the first wireless communication scheme and the second wireless communication scheme, wherein the first base station acquires communication information on a communication state of the second wireless communication scheme and the first base station includes a wireless communication unit that transmits a notification signal including the communication information by the first wireless communication scheme, and wherein the mobile station receives the notification signal by the first wireless communication scheme and the mobile station includes a controller that selects whether to maintain data communication by the first wireless communication scheme or to switch the first wireless communication scheme to the second wireless communication scheme, based on the communication information included in the notification signal and an amount of communication data processed by the mobile station.

In the above communication system, the controller of the mobile station may maintain the first wireless communication scheme when the amount of communication data processed by the mobile station is small, and may switch the first wireless communication scheme to the second wireless communication scheme when the amount of communication data is large.

In the communication system, the first base station may acquire the communication information from the second base station.

In the communication system, the first base station may support the second wireless communication scheme in addition to the first wireless communication scheme and may acquire the communication information on the second wireless communication scheme of the first base station.

In the communication system, the mobile station may perform location registration in the first base station supporting at least the first wireless communication scheme.

In the communication system, the communication information may include information representing whether a radio wave of the second wireless communication scheme arrives and information representing whether high-speed communication is possible when the radio wave arrives.

In the communication system, in a waiting state, the controller of the mobile station may perform, if the radio wave of the first wireless communication scheme arrives and there is a processing by the mobile station, a processing by the first wireless communication scheme with acquiring the communication information, and perform, if a radio wave of the first wireless communication scheme does not arrive and the radio wave of the second wireless communication scheme arrives and if there is a processing by the mobile station, a processing by the second wireless communication scheme.

According to an aspect of the present invention, a base station supports at least a first wireless communication scheme, wherein the base station acquires communication information on a communication state of a second wireless communication scheme having a faster communication speed and larger power consumption during wireless communication than the first wireless communication scheme and transmits a notification signal including the communication information to a mobile station by the first wireless communication scheme.

According to an aspect of the present invention, a mobile station receives a notification signal including a communication information regarding a second wireless communication scheme having a faster communication speed and larger power consumption during wireless communication than the first wireless communication scheme from a base station supporting at least a first wireless communication scheme, wherein the mobile station receives the notification signal by the first wireless communication scheme, and wherein the mobile station includes a controller that selects whether to maintain data communication by the first wireless communication scheme or to switch the first wireless communication scheme to the second wireless communication scheme, based on the communication information included in the notification signal and an amount of communication data processed by the mobile station.

According to an aspect of the present invention, a communication method of performing communication uses a first base station that supports a first wireless communication scheme, a second base station that supports a second wireless communication scheme having faster communication speed and larger power consumption during wireless communication than the first wireless communication scheme, and a mobile station that supports the first and the second wireless communication schemes, the communication method including: causing the first base station to acquire communication information on a communication state of the second wireless communication scheme; causing the first base station to transmit a notification signal including the communication information by the first wireless communication scheme; causing the mobile station to receive the notification signal by the first wireless communication scheme; and causing the mobile station to select whether to maintain data communication by the first wireless communication scheme or to switch the first wireless communication scheme to the second wireless communication scheme, based on the communication information included in the notification signal and an amount of communication data processed by the mobile station.

According to the present invention, it is possible to provide a communication system, a base station, a mobile station, and a communication method in which power consumption can be sufficiently reduced in spite of supporting various wireless communication schemes.

DETAILED DESCRIPTION OF THE PRESENT INVENTION

Hereinafter, desirable embodiments of the present invention will be described in detail with reference to the accompanying drawings. Measurements, materials, other specific numbers, or the like shown in the embodiments are described as examples to easily understand the present invention, and does not limit the present invention except for a specially mentioned case. In the specification and drawings of the present invention, some elements that have substantially the same functions and configurations will not be repeated by denoting the same mark, and other elements that do not directly relate to the present invention will not be illustrated.

Figure 1:
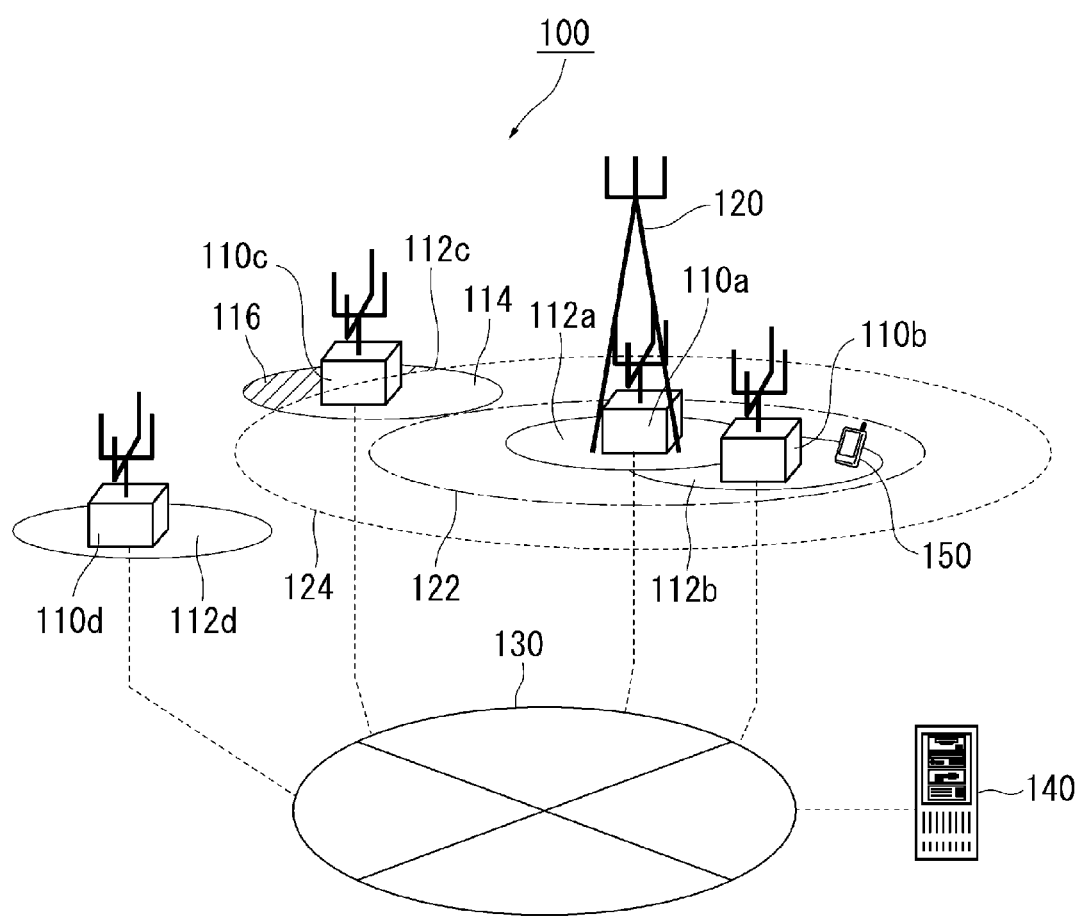
FIG. 1 is a block diagram illustrating a schematic configuration of a communication system according to an embodiment of the present invention.

FIG. 1 is a block diagram illustrating a schematic configuration of a communication system according to an embodiment of the present invention. The communication system 100 can employ two wireless communication schemes having different power consumption from each other. The two wireless communication schemes are a first wireless communication scheme (hereinafter, referred to as a wireless B) r as a Personal Handy phone System (PHS) and a second wireless communication scheme (hereinafter, referred to as a wireless A) such as a Long Term Evolution (LTE). In comparison with the wireless B, the wireless A has larger power consumption, has a larger amount of communication and carries out higher-speed communication. However, the wireless B has a less amount of communication and a lower communication speed but has smaller power consumption.

As illustrated in the drawing, the communication system 100 includes plural first base stations (PHS, Base Stations 110a to 110d) supporting the wireless B and a second base station (LTE base station 120). The communication system 100 further includes a backbone (communication network) 130 such as the Internet or a leased line, a management server 140, the wireless A, and a terminal (Mobile Station) 150 supporting the wireless A and the wireless B. The management server 140 is wired to each of the base stations 110a to 110d and 120 through the communication network 130, and manages and maintains information, such as an IP address, of the communication network 130 and the base stations 110a to 110d and 120.

Hereinafter, except for a specially mentioned case, a PHS base station 110 is considered to be called all of the PHS base stations 110a, 110b, 110c, and 110d. As illustrated in the drawing, areas 112a, 112b, 112c, and 112d which are within a radius of about 200m from the PHS base station 110 and which enables wireless communication by the wireless B exist in the communication system 100. An area 122 in which high-speed communication by the wireless A can be performed and an area 124 in which an access to the LTE base station 120 by the wireless A can be performed exist around the LTE base station 120.

In the communication system 100, if the mobile station 150 is located in the areas 112a and 112b, wireless communication can be performed in any communication scheme of the wireless A and the wireless B. The area 112c includes one section 114 that overlaps the area 124 and the other section 116 that does not overlap the area 124 and is illustrated as a shaded section. Accordingly, when the mobile station 150 is located in the area 112c, communication by the wireless B can be performed, but a communication possibility by the wireless A is changed based on a communication state of the wireless A. When the mobile station 150 is located in the area 112d, communication by the wireless B can be performed, but communication by the wireless A cannot be performed.

The communication system 100 according to this embodiment employs a configuration in which the wireless B having lower power consumption, of wireless communication schemes of the wireless A and the wireless B, is preferentially selected relative to the wireless A having larger power consumption, and in which power consumption can be reduced when the mobile station 150 is in a waiting state or the like.

Figure 2A:
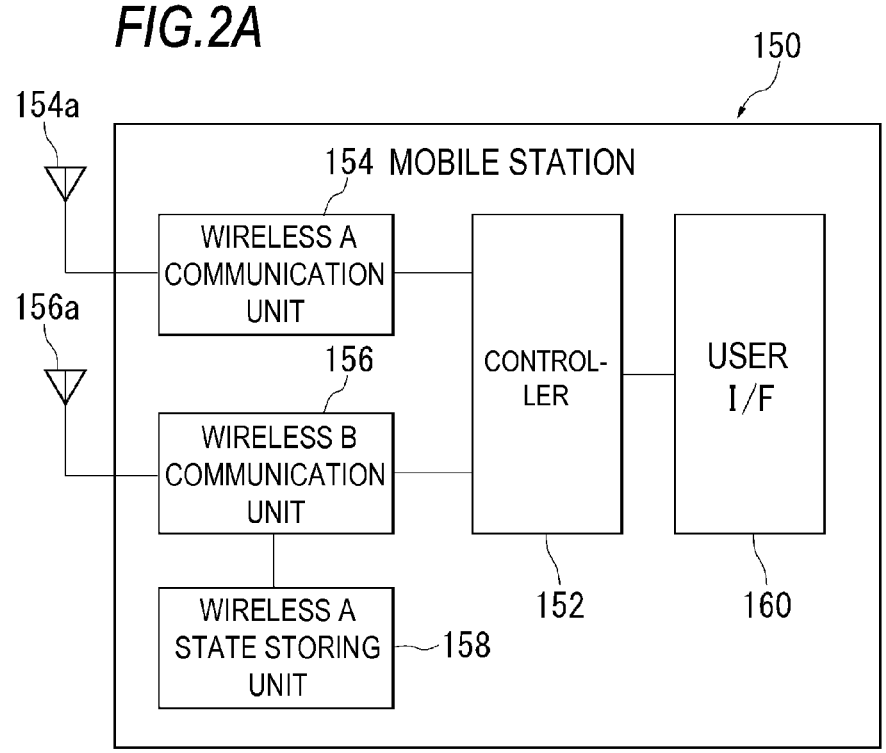
FIGS. 2A and 2B are functional block diagrams schematically illustrating configurations of a mobile station and a PHS base station illustrated in FIG. 1.
Figure 2B:
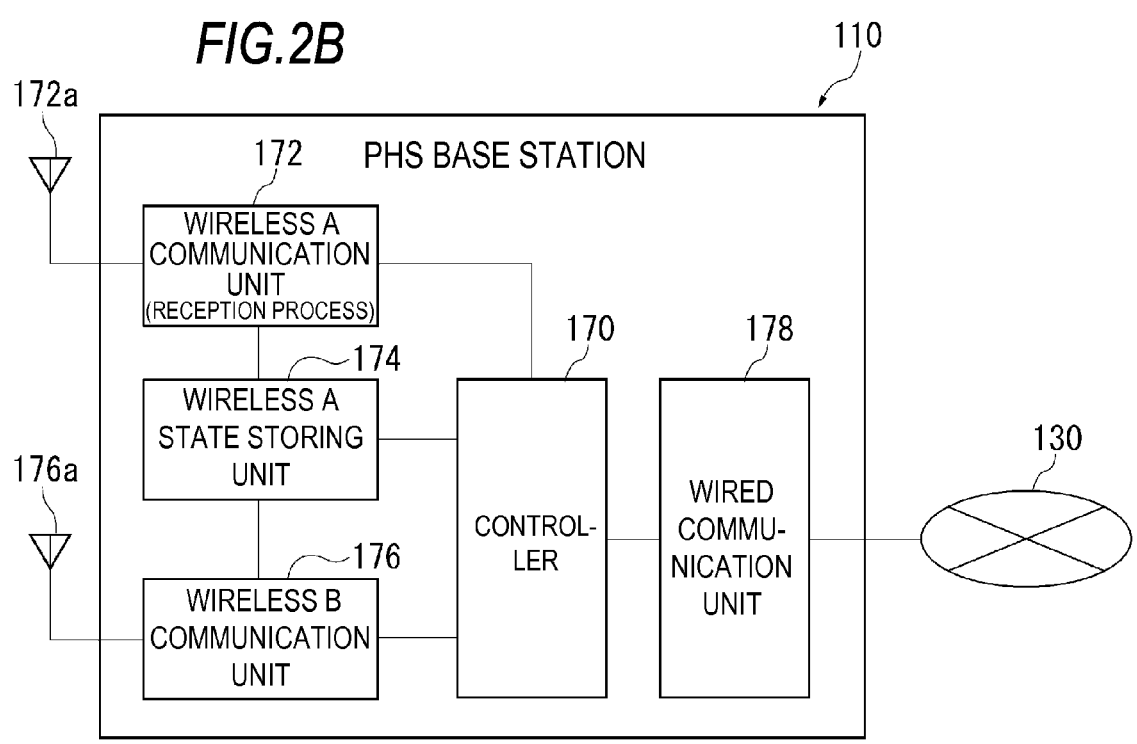

FIGS. 2A and 2B are functional block diagrams schematically illustrating configurations of a mobile station 150 and a PHS base station 110 illustrated in FIG. 1. The mobile station 150 can support the wirelesses A and B and can perform wireless communication with any one of the PHS base station 110 and the LTE base station 120. As illustrated in FIG. 2A, the mobile station 150 includes a controller 152, a wireless A communication unit 154, a wireless B communication unit 156, a wireless A state storing unit 158, and a user I/F 160. The controller 152 is configured by a semiconductor integrated circuit including a central processing unit (CPU), and the like, and manages and controls whole of the mobile station 150.

The wireless A communication unit 154 performs wireless communication with the LTE base station 120 by the wireless A through a communication antenna 154a. The wireless B communication unit 156 performs wireless communication with the PHS base station 110 by the wireless B through a communication antenna 156a. As be described in detail below, the wireless B communication unit 156 receives a notification signal transmitted by the wireless B from the PHS base station 110. The notification signal includes communication information regarding a communication state of the wireless A.

The wireless A state storing unit 158 includes ROM, RAM, EEPROM, nonvolatile RAM, flash memory, HDD, and the like. The controller 152 extracts communication information from the notification signal that is received via the wireless B by the wireless B communication unit 176, and stores the communication information in the wireless A state storing unit 158.

The PHS base station 110 supports the wireless B. Regarding the wireless A, the PHS base station 110 measures, for example, an intensity of a received signal strength indication (RSSI), and further receives information representing an idle resource in a wired communication to acquire the communication information. As illustrated in FIG. 2B, the PHS base station 110 includes a controller 170, a wireless A communication unit 172, a wireless A state storing unit 174, a wireless B communication unit 176, and a wired communication unit 178.

The controller 170 is configured by a semiconductor integrated circuit including a central processing unit (CPU), and the like, and manages and controls whole of the PHS base station 110. The wireless A communication unit 172 performs a receiving process such as measuring the RSSI of a radio wave from the LTE base station 120 through a communication antenna 172a. The wireless B communication unit 176 performs wireless communication, for example, with the mobile station 150 by the wireless B through a communication antenna 176a. The wired communication unit 178 performs wired communication with the LTE base station 120 through the communication network 130, and receives information representing an idle resource of the LTE base station 120.

The controller 170 acquires the communication information based on the measurement result of the RSSI from the wireless A communication unit 172 and information representing an idle resource from the wired communication unit 178. As the communication information, information representing whether a radio wave of the wireless A arrives and information representing whether high-speed communication can be performed when a wave arrives may be given.

The controller 170 stores the communication information in the wireless A state storing unit 174. The wireless B communication unit 176 reads out the communication information from the wireless A state storing unit 174 in accordance with an instruction of the controller 170, and incorporates the read out communication information into a notification signal such as a control signal CCH (Control Channel) that is periodically transmitted by own station and transmits the notification signal by the wireless B.

Figure 3:
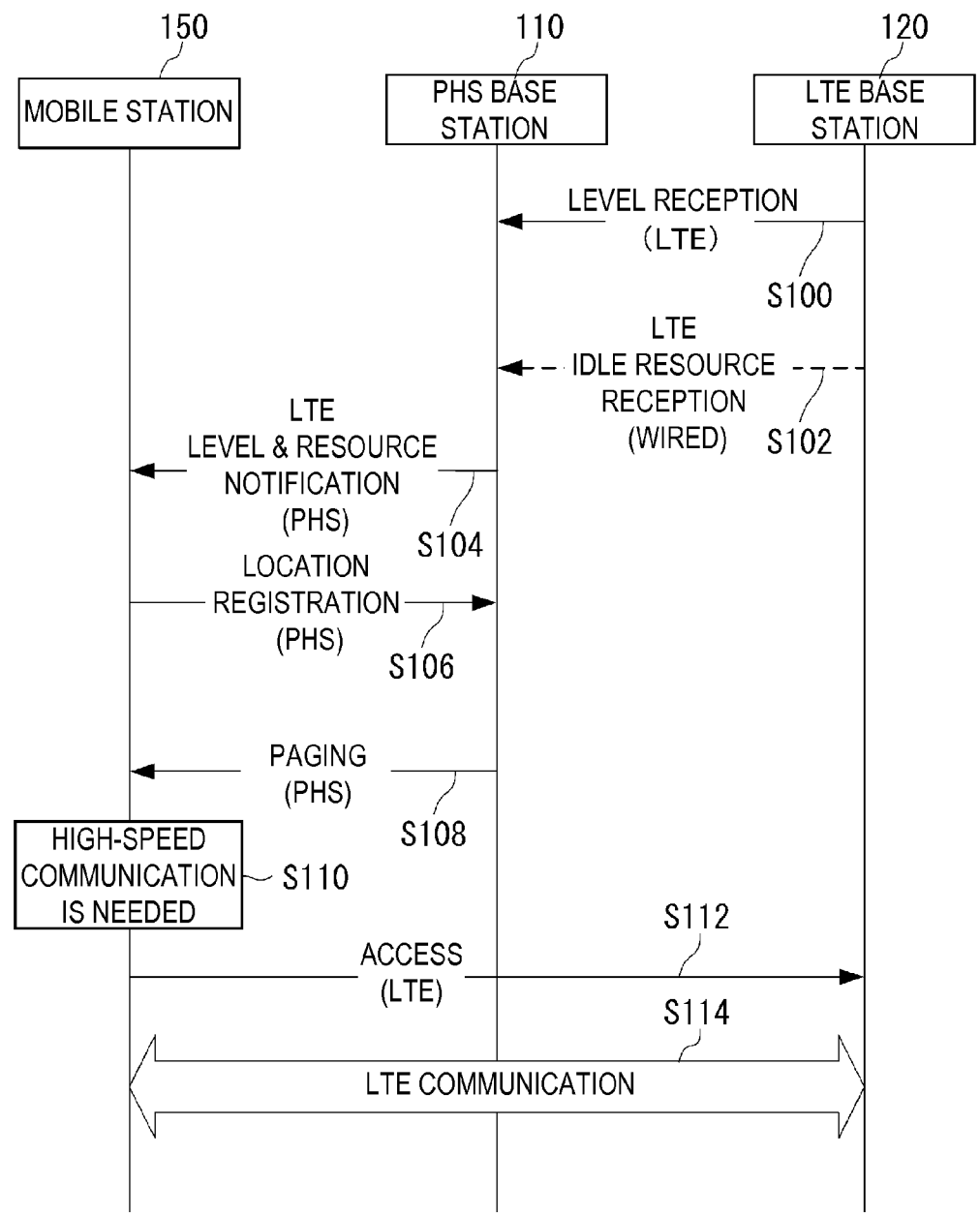
FIG. 3 is a sequential diagram illustrating a processing when the mobile station starts communication.

FIG. 3 is a sequential diagram illustrating a processing when the mobile station 150 illustrated in FIG. 1 starts communication. First, the PHS base station 110 perform a receiving process such as measuring the RSSI of a radio wave transmitted from the LTE base station 120 by the wireless A communication unit 172 (step S100). Next, the PHS base station 110 performs a wired communication with the LTE base station 120 through the communication network 130 by the wired communication unit 178, and receives information representing whether an idle resource exists in the LTE base station 120 (step S102).

Subsequently, the PHS base station 110 acquires communication information on a communication state of the wireless A from the information received in step S100 and S102, and incorporates the acquired communication information into a notification signal and transmits the notification signal by the wireless B (step S104).

The mobile station 150 receives the notification signal transmitted in step S104 by the wireless B, and then, for example, performs location registration in the PHS base station by the wireless B (step S106). Next, the PHS base station 110 performs paging to the mobile station 150 the wireless B (step S108).

When the controller 152 determines that high-speed wireless communication, that is, wireless communication by the wireless A is needed based on the communication information included in the notification signal received in step S104 and the amount of communication data processed by own station (step S110), the mobile station 150 transmits an access request to the LTE base station 120 using the wireless A communication unit 154 (step S112), and starts wireless communication by the wireless A (step S114).

Figure 4:
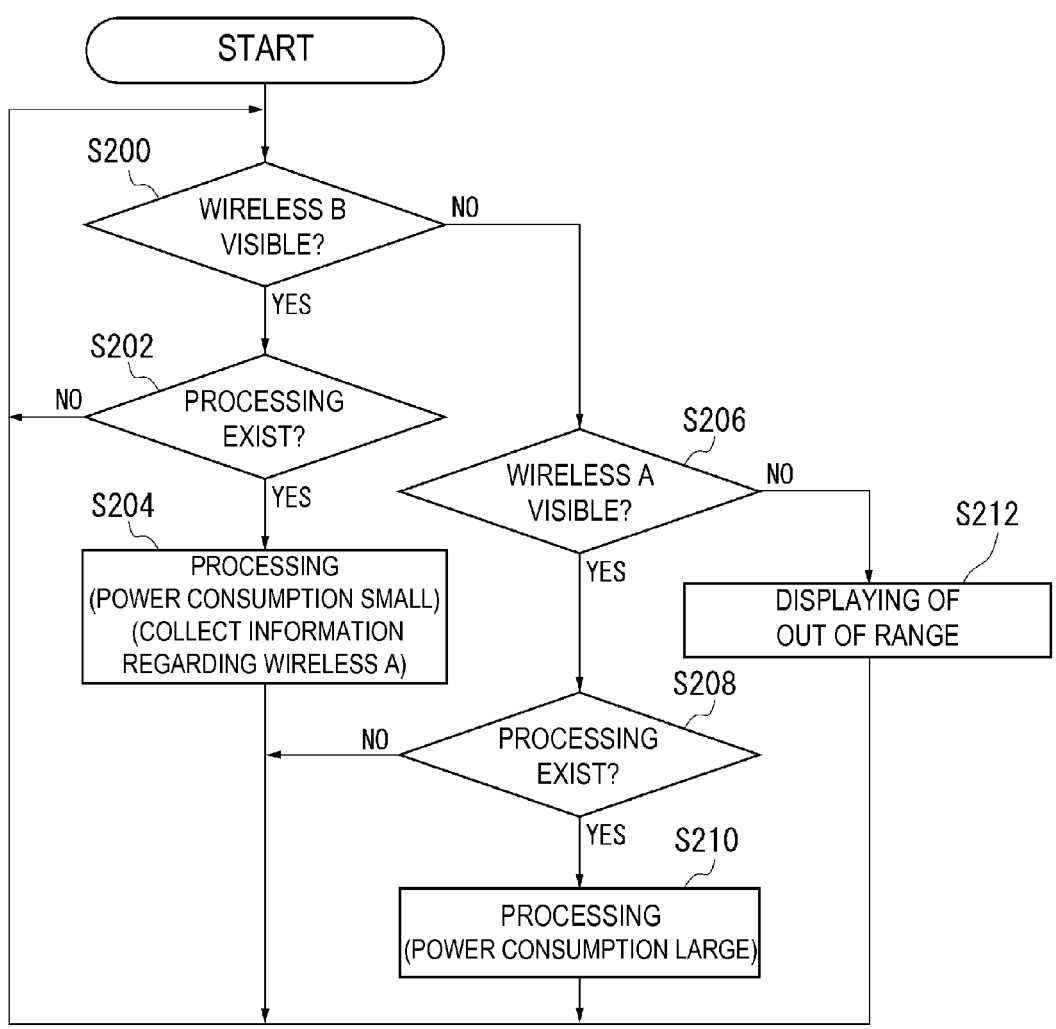
FIG. 4 is a flow chart illustrating an operation of the mobile station illustrated in FIG. 1 in a waiting state.

FIG. 4 is a flow chart illustrating an operation of the mobile station 150 illustrated in FIG. 1 in a waiting state. The controller 152 of the mobile station 150 determines whether the wireless B is visible in the waiting state (step S200), and, when the wireless B is visible, that is, when radio waves of the wireless B arrive (Yes), determines whether there is a processing such as location registration of own station (step S202).

When there is a processing in step S202 (Yes), the controller 152 acquires communication information on a communication state of the wireless A and performs the processing by the wireless B (step S204). When there is no processing by own station in step S202 (No), the processing flow is returned to step S200. When the wireless B is not visible in step S200 (No), the controller 152 determines whether the wireless A is visible (step S206). When the wireless A is visible, the controller 152 determines whether there is a processing by own station (step S208).

When there is a processing in step S208 (Yes), the controller 152 performs the processing by the wireless A (step S210), and there is no processing by own station (No), the processing returns to step S200. When the wireless A is not visible in step S206 (No), the controller 152 controls the user I/F 160 so as to perform displaying of an out-of-range area (step S212). As a result, since the mobile station 150 preferentially uses the wireless B having small power consumption relative to the wireless A having large power consumption in a waiting state, the power consumption based on the processing can be reduced.

Figure 5:
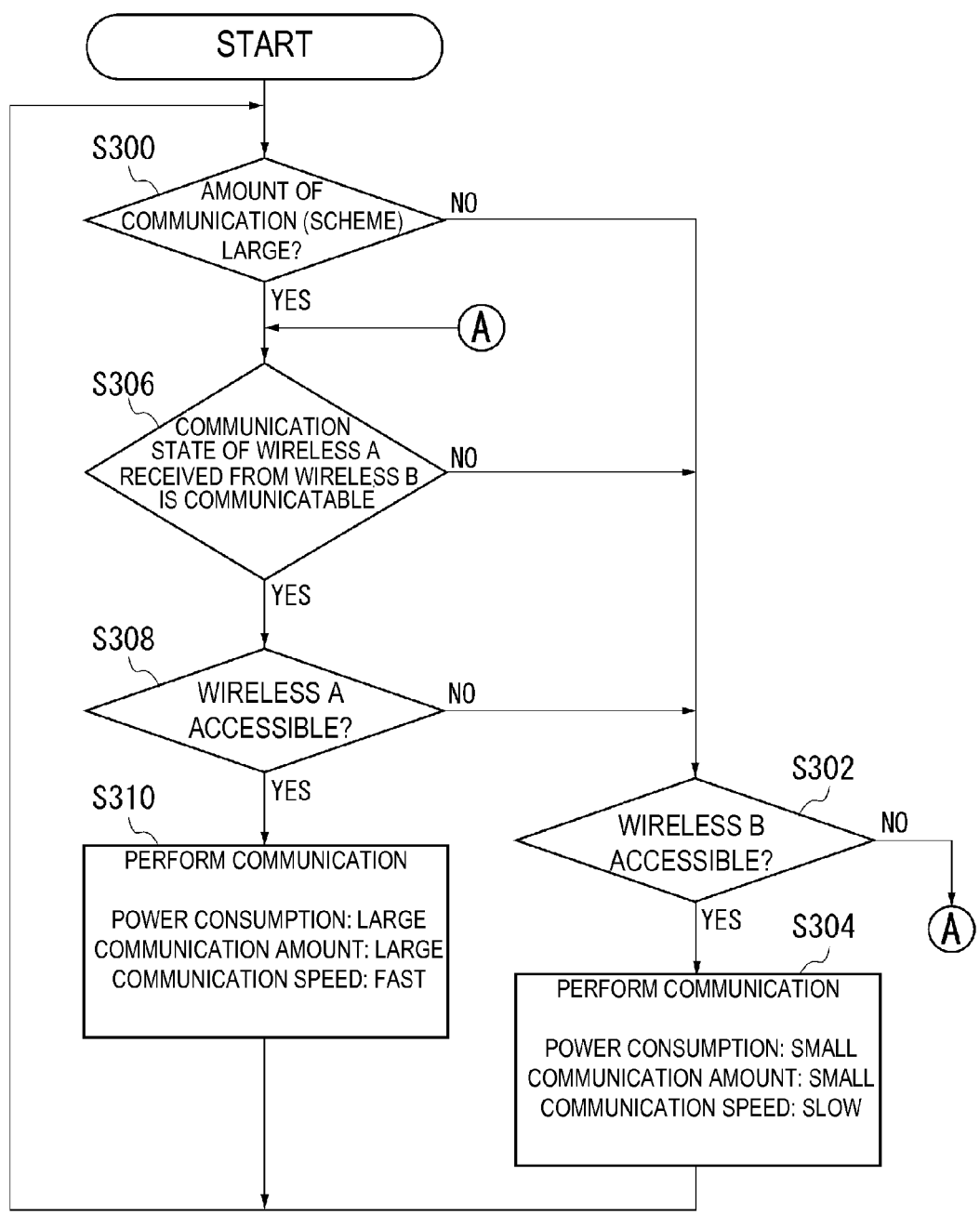
FIG. 5 is a flow chart illustrating an operation of the mobile station illustrated in FIG. 1 in a communication state.

FIG. 5 is a flow chart illustrating an operation of the mobile station 150 illustrated in FIG. 1 in a communication state. The mobile station 150 determines whether the amount of communication data of own station during communication is large or not (step S300). The amount of communication data may be determined based on the amount of data accumulated in a buffer in the mobile station 150, and may also be determined based on the communication type. For example, when a processing of own station relates to control of location registration or the like, the amount of communication data is small, but when the processing of own station relates to some process else besides the control, the communication data may be considered to have a large amount.

When the amount of communication data is small in step S300 (No), the controller 152 determines whether wireless communication by the wireless B is accessible (step S302), and then performs communication by the wireless B (step S304) when it is accessible.

Meanwhile, when the amount of communication data is large in step S300

(Yes) and when the wireless B is not accessible in step S302, the controller 152 determines whether communication by the wireless A is capable of the communication based on the communication information (step S306). Here, the determination of step S306 is merely to determine whether the wireless A is visible, and it is not clear whether the LTE base station 120 is actually accessible by the wireless A.

Therefore, when communication by the wireless A is possible in step S306 (Yes), the controller 152 additionally determines whether the LTE base station 120 is accessible by the wireless A (step S308). When it is accessible (Yes), the communication by the wireless A is performed (step S310). When the communication by the wireless A is not possible in step S306 (No) or when the wireless A is accesible in step S308 (No), the processing of step S302 is performed to determine whether the wireless B is accesible.

In this way, when the processing of own station is a processing to control of location registration or the like and the amount of communication data is small, the mobile station 150 maintains the wireless B, and the processing is a processing other than the control and the amount of communication data is large, the mobile station 150 switches the wireless B to the wireless A. That is, the mobile station 150 preferentially employs the wireless B only when the amount of communication data is small, and thus the power consumption in a waiting state can be reduced, for example. As a result, it is possible to reduce the power consumption of the battery, thereby enabling waiting for a long time.

Figure 6:
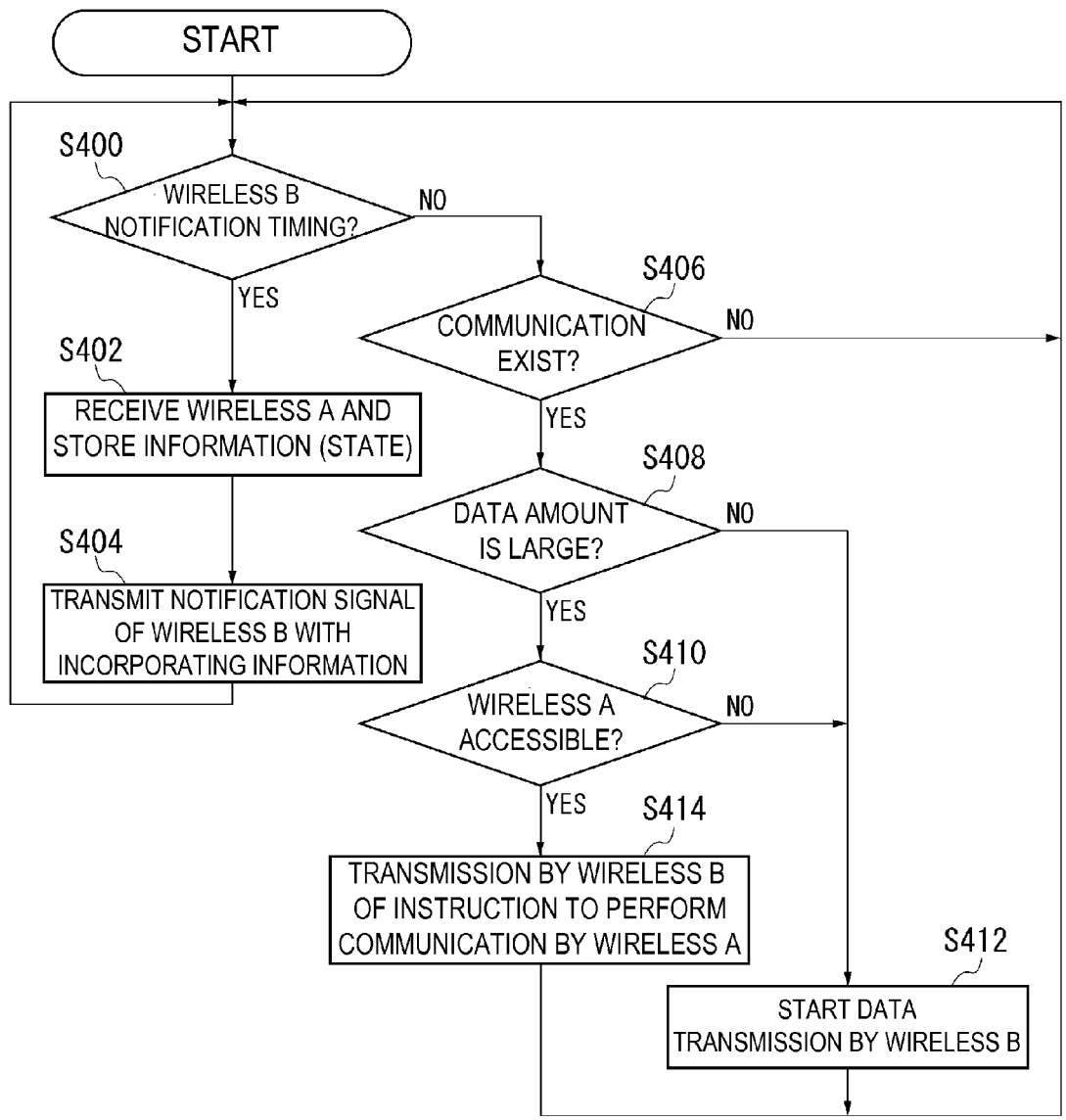
FIG. 6 is a flow chart illustrating the whole flow of the PHS base station illustrated in FIG. 1.

FIG. 6 is a flowchart illustrating the whole flow of the PHS base station 110 illustrated in FIG. 1. The PHS base station 110 receives the wireless A and stores the information (state) (step S402) when it is in a timing at which own station transmits a notification signal by the wireless B (Yes in step S400). The processing of step S402 corresponds to steps S100 and S102 illustrated in FIG. 3, and the communication information is acquired and the controller 170 stores the acquired communication information in the wireless A state storing unit 174.

Subsequently, the controller 170 adds the communication information to the notification signal and transmits the notification signal by the wireless B (step S404). The processing of step S404 also corresponds to step S104.

In step S400 (No), when the timing of transmitting the notification signal does not come the controller 170 determines whether communication is being carried out (step S406). When communication is being carried out (Yes), the controller 170 additionally determines whether the amount of communication data is large (step S408). Then, when the amount of communication data is large (Yes), the controller 170 determines whether the wireless A is accessible (step S410).

When the amount of data is small in step S408 (No) and the wireless A is not accessible in step S410 (No), the controller 170 starts directly data transmission by the wireless B (step S412). When the wireless A is accessible in step S410, an instruction to switch the wireless B to the wireless A is transmitted to the mobile station 150 by the wireless B (step S414).

According to this embodiment, the communication information on the wireless A (LTE) having large power consumption of two wireless communication schemes having different power consumption is incorporated into the notification signal of the wireless B (PHS) having small power consumption and then the notification signal is transmitted. As a result, the mobile station 150 can reduce power consumption due to the reception of the notification signal, and can select whether to maintain of the data transmission by the wireless or switch of the wireless B to the wireless A and starting of the data transmission based on the communication information and the amount of communication data. That is, according to the communication system 100, since the wireless B having small power consumption relative to the wireless A having large power consumption can be preferentially selected, it is possible to reduce the power consumption.

The mobile station 150 performs, for example, the location registration in a waiting state only on the PHS base station 110 supporting the wireless B. As a result, the mobile station 150 can reduce power consumption based on the location registration which is performed in the waiting state. At this time, the PHS base station 110 supporting the wireless B of which the mobile station 150 performs the location registration may transmit information representing that the mobile station 150 has performed the location registration to a neighboring or surrounding LTE base station 120, for example, by wired communication, and may register the location of the mobile station 150 in the LTE base station 120 supporting the wireless A.

The communication information includes information representing whether a radio wave of the wireless A arrives and information representing whether high-speed communication is possible when the radio wave arrives. As a result, even when the mount of communication data processed by own station is large, the mobile station 150 can maintain the wireless B without switching the wireless B to the wireless A, based on the communication information.

In the above-mentioned embodiment, the communication information included in the notification signal includes the information representing whether a radio wave of the wireless A arrives and the information whether high-speed communication is possible when the radio wave arrives, but the present invention is not limited to this example and wireless communication quality, expected throughput, or the like may be included.

As the notification signal, a control signal (CCH) that own station periodically transmits is exemplified, but the present invention is not limited to this example. An identifier SCID of each base station, a channel for notification BCCH, or a notification arrival information channel PCH may be used.

In a time when the communication information on the wireless A is acquired, the PHS base station 110 measures the received signal strength indication (RSSI) of the LTE base station 120 by the wireless A communication unit 172, but the present invention is not limited to this configuration. For example, the PHS base station 110 may support the wireless A in addition to the wireless B, and perform wireless communication with the LTE base station 120 by the wireless A to acquire the communication information of the wireless A. If the PHS base station 110 supports the wireless A in addition to the wireless B, the PHS base station 110 may acquire, for example, communication information based on information representing idle resources of the wireless A of own station, and transmit a notification signal of the wireless B in which the communication information is included.

While preferable embodiments of the present invention have been described with reference to the accompanying drawings, the present invention is not limited to the embodiments. It is apparent that all changes and modifications can be conceived within the scope of the appended claims, and it is to be understood by those skilled in the art that the changes and modifications belong to the technical scope of the present invention.

INDUSTRIAL APPLICABILITY

The present invention can be utilized in a communication system and a communication method and a base station and a mobile station which are included in the communication system, which are possible to employ various wireless communication schemes.

The present invention was described in detail or with reference to the embodiments, but it is apparent to those skilled in the art that all changes and modifications can be further comprised herein. This application claims priority on Japanese Patent Application No. 2013-111941, filed on May 28, 2013, the content of which is incorporated herein by reference.

REFERENCE SIGNS LIST

100 communication system
110, 110a, 110b, 110c, 110d PHS base station
120 LTE base station
130 communication network
140 management server
150 mobile station
152, 170 controller
154, 172 wireless A communication unit
156, 176 wireless B communication unit
158, 174 wireless A state storing unit
160 user I/F
178 wired communication unit

The invention claimed is:

1. A communication system, comprising:
a first base station that supports a first wireless communication scheme;
a second base station that supports a second wireless communication scheme having a faster communication speed and larger power consumption during wireless communication than the first wireless communication scheme; and
a mobile station that supports the first wireless communication scheme and the second wireless communication scheme,
wherein in a waiting state, the mobile station preferentially selects the first base station over the second base station for a location registration,
wherein the first base station acquires communication information on a communication state of the second wireless communication scheme,
wherein the first base station includes a wireless communication unit that transmits, by the first wireless communication scheme, a notification signal including the communication information,
wherein the mobile station receives the notification signal transmitted by the first base station, and
wherein the mobile station includes a controller that selects whether to maintain data communication by the first base station or to switch the first wireless communication scheme to the second wireless communication scheme, based on the communication information included in the notification signal and an amount of communication data processed by the mobile station.

2. The communication system according to claim 1, wherein the first base station acquires the communication information from the second base station.

3. The communication system according to claim 1, wherein the first base station supports the second wireless communication scheme in addition to the first wireless communication scheme, and acquires the communication information on the second wireless communication scheme of the first base station.

4. The communication system according to claim 1, wherein the mobile station performs the location registration in the first base station supporting at least the first wireless communication scheme.

5. The communication system according to claim 1, wherein the communication information includes:
information representing whether a radio wave of the second wireless communication scheme arrives, and
information representing whether high-speed communication is possible when the radio wave arrives.

6. The communication system according to claim 1, wherein in the waiting state, the controller of the mobile station:
performs, when (i) a radio wave of the first wireless communication scheme arrives and (ii) there is a processing by the mobile station, a processing by the first wireless communication scheme with acquiring the communication information, and
performs, when (i) a radio wave of the first wireless communication scheme does not arrive, (ii) a radio wave of the second wireless communication scheme arrives and (iii) there is a processing by the mobile station, a processing by the second wireless communication scheme.

7. The communication system according to claim 1, wherein the first wireless communication scheme is Personal Handy phone System (PHS), and the second wireless communication scheme is Long Term Evolution (LTE).

8. The communication system according to claim 1,
the first base station transmits information representing that the mobile station has performed the location registration to the second base station.

9. The communication system according to claim 8,
the first base station registers the location of the mobile station in the second base station.

10. A mobile station that supports a first wireless communication scheme and, said mobile station comprising:
a controller configured to, in a waiting state, preferentially select a first base station that supports the first wireless communication scheme over a second base station that supports the second wireless communication scheme for a location registration, wherein the second wireless communication scheme has a larger power consumption than the first wireless communication scheme; and
a receiver configured to receive a notification signal including communication information regarding the second wireless communication scheme having a faster communication speed and larger power consumption during wireless communication than the first wireless communication scheme from the first base station,
wherein the receiver receives the notification signal by the first wireless communication scheme, and
wherein the controller is configured to select whether to maintain data communication by the first base station or to switch the first wireless communication scheme to the second wireless communication scheme, based on the communication information included in the notification signal and an amount of communication data processed by the mobile station.

11. The mobile station according to claim 10,
wherein the first wireless communication scheme is Personal Handy phone System (PHS), and the second wireless communication scheme is Long Term Evolution (LTE).

12. A communication method of performing communication using:
a first base station that supports a first wireless communication scheme,
a second base station that supports a second wireless communication scheme having faster communication speed and larger power consumption during wireless communication than the first wireless communication scheme, and
a mobile station that supports the first and the second wireless communication schemes,
the communication method comprising:
causing the mobile station to, in a waiting state, preferentially select the first base station over the second base station for a location registration;
causing the first base station to acquire communication information on a communication state of the second base station;
causing the first base station to transmit, by the first wireless communication scheme, a notification signal including the communication information;
causing the mobile station to receive the notification signal transmitted by the first base station; and
causing the mobile station to select whether to maintain data communication by the first base station or to switch the first wireless communication scheme to the second wireless communication scheme, based on the communication information included in the notification signal and an amount of communication data processed by the mobile station.

13. The communication method according to claim 12,
wherein the first wireless communication scheme is Personal Handy phone System (PHS), and the second wireless communication scheme is Long Term Evolution (LTE).

* * * * *